United States Patent Office 2,755,909
Patented July 24, 1956

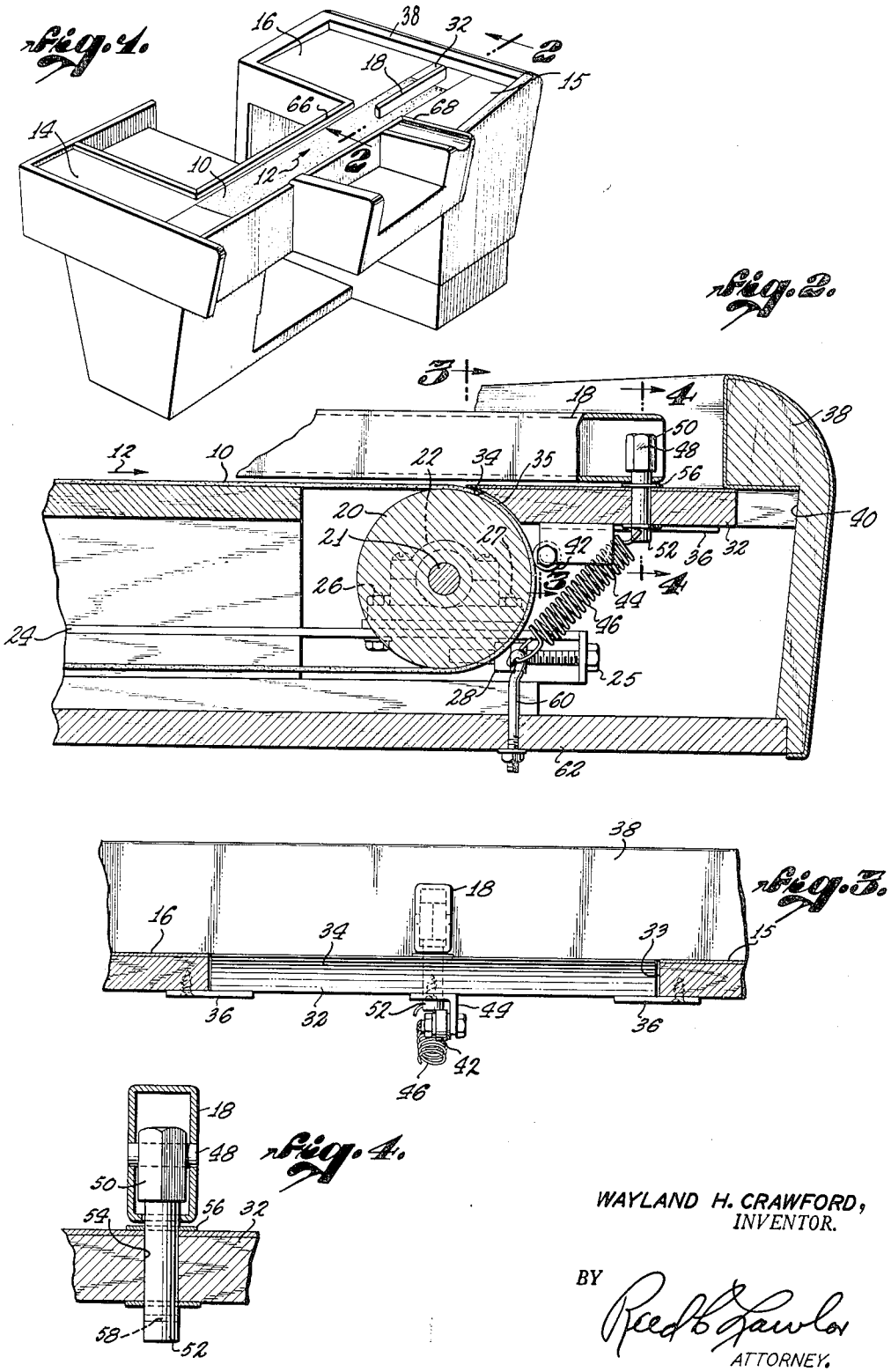

2,755,909
AUTOMATIC CHECK STAND

Wayland H. Crawford, San Gabriel, Calif., assignor to Modern Village Stores, Inc., a corporation of California Application June 18, 1952, Serial No. 294,120

8 Claims. (Cl. 198—65)

My invention relates to improvements in conveyor systems, and more particularly to improvements in check stands that are employed for checking out customers in retail stores, such as grocery stores.

In my Patent No. 2,723,728 there is disclosed and claimed an improved check stand in which a conveyor belt is employed to feed a succession of items to be checked from an unloadding position to a sacking position. A belt employed in such a check stand is subject to stretching with age. For this reason, the drum, or pulley, over which the conveyor belt is guided is adjustably positioned relative to the check stand.

Among other features, such a check stand employs a pivoted diverting arm at the discharge end of the belt to guide the items being discharged to a sacking platform or table where they are then placed in bags, boxes or other containers.

It is an object of my present invention to provide an improved check stand wherein a movable table section is employed adjacent an adjustable positioned pulley to facilitate adjustment of the pulley position to accommodate stretch of the conveyor belt without varying the gap between the table section and the belt.

Another object of my invention is to provide means for slidably and rockably supporting said table section in position so that the gap between it and the conveyor belt may be readily increased for safety purposes in the event that objects enter the gap.

Another object of my invention is to provide such a table section with a diverting arm pivotally mounted thereon with common means for holding both said diverting arm and said table section in their normal operating position in the conveyor system.

Another object of my invention is to provide a conveyor system with a yieldingly mounted table section opposite the belt pulley.

My invention possesses numerous objects and features of advantages, some of which together with the foregoing will be set forth in the following description of a single embodiment thereof. Though only one embodiment of my invention is described herein in detail, it is to be understood that my invention is not limited thereto but may be embodied in many other forms within the scope of the appended claims.

In the drawing, wherein like reference characters indicate like elements throughout the several views:

Figure 1 is an isometric view of a check stand incorporating my invention;

Fig. 2 is a fragmentary sectional drawing taken on the line 2—2 of Fig. 1;

Fig. 3 is a fragmentary sectional view taken on the line 3—3 of Fig. 2; and

Fig. 4 is a detailed sectional drawing taken on the line 4—4 of Fig. 2.

Referring to the drawing, and more particularly to Figure 1, there is illustrated a check stand of the type described and claimed in my aforementioned Patent No. 2,723,728 and to which my present invention is applied.

This check stand employs a single conveyor belt 10 to carry a stream of items in the direction of the arrow 12 from a loading platform 14 to either sacking platform 15 or sacking platform 16, according to the position of the diverting arm 18. The platforms 14, 15 and 16 constitute table surfaces that are coplanar with the upper surface of the conveyor belt 10. The conveyor belt 10 is of the endless or continuous type, being guided by two pulleys, one at the forward end and one at the rearward end, all as described in detail in my Patent No. 2,723,728. Such a belt 10 may be made of leather, plastic, canvas or other belting material. Since all of such materials are of a stretchable nature and become permanently stretched more and more with usage, suitable means are provided for adjusting the takeup of the pulleys at the ends of the belts.

As shown in Fig. 2, the driven pulley 20 is mounted upon a shaft 21 rotatably supported by a pair of similarly mounted bearings 22 at opposite ends thereof, only one of the bearings being shown. Each of the bearings 22 is supported upon a rail 24, being adjustably positioned thereon by means of an adjusting screw 25. Each of the bearings 22 is secured to the corresponding rail 24 by means of screws 26 and 27 passing through slots (not shown) in the rails. The adjusting screws 25 threadably engage threads (not shown) in the heads 28 of the adjacent holding screws 27. The other pulley driven by an electric motor (also not shown) is located at the other end of the conveyor belt, all as described in my aforementioned Patent No. 2,723,728.

According to the present invention, a movable table section 32 is arranged within an aperture or opening 33 between the two sacking platforms 15 and 16. This table section has a curved forward portion or nose 34 arranged concentrically with the pulley 20, leaving a gap 35 between itself and the pulley, through which gap the conveyor belt 10 moves. Suitable means described in more detail hereinbelow are provided for establishing the small gap between the curved nose 34 and the belt 10 itself. The upper surface of the table section 32 is coplanar with the upper surface of the conveyor belt 10.

Two support members in the form of strips or plates 36 secured to the lower sides of the sacking platforms 15 and 16 slidably support the table section 32 so that it may be moved horizontally to and fro along the axis of the belt 10. A cross-member 38 in the form of a guard wall is arranged at the rear end of the table above the surfaces of the sacking platforms 15 and 16, providing a recessed reentrant portion 40 for receiving the rear end of the table section 32 as it is slid to and fro on the support members 36. The rear ends of the support members 36 terminate directly beneath the front end of the cross-member 38 in order that the front end of the table section may be tilted upwardly white its rear end is rockably supported upon the rear ends of the support members.

A spacer comprising a roller 42 is mounted on the lower side of the table section 32 opposite the pulley 20 to facilitate maintaining constant spacing between the table section and the belt 10. The roller 42 is rotatably supported upon a bracket 44 secured to the lower side of the table section 32. The axis of rotation of the roller 42 is parallel to the axis of rotation of the pulley 20, both axes being horizontal, and the roller 42 is arranged midway between the sides of the table section 32. Resilient means in the form of a spring 46 urge the roller 42 into engagement with the belt 10 to maintain constant spacing between the table section and the belt, and, incidentally, between the table section and the pulley.

The diverting arm 18 is of hollow construction and is pivotally supported at its rear end by a pin 48 which extends horizontally through the head 50 of a vertically rotatable shaft 52 journalled in a bore 54 in the table section 32. With this arrangement the diverting arm 18 may be moved to a left or right position in contact with guard members 66 and 68 on opposite sides of the conveyor belt 10. In either of these positions the diverting arm 18 guides items to one of the sacking platforms 15 or 16, or the other, as the case may be. Also with this arrangement, the diverting arm 18 may be lifted over the guard members 66 and 68 and be placed in an inoperative position on one of the sacking platforms or the other. In raising the diverting arm over one of the guard members 66 or 68, the rear end of the diverting arm bears against a washer 56 that encircles the shaft 52 between the diverting arm and the table section 32.

The spring 46 is of the tension type and is pre-stressed, being connected between an eye 58 at the lower end of the shaft 52 and an eye bolt 60 which is secured to a frame member 62 located on the check stand beneath the pulley 20.

The spring 46 normally urges the shaft 52 downward but also permits the diverting arm 18 to be raised by lifting the shaft 52 slightly while being raised over the guard members 66 or 68.

The spring 46 also serves to draw the table section 32 slidably forward upon the support members 36 into a position where the roller 42 engages the belt 10, thus establishing the spacing between the nose portion 34 of the table section and the belt 10. In addition, the spring 46 permits the table section 32 and the diverting arm 18 to be rockably raised to increase the gap 35 in case some foreign object enters the gap. One advantage of this arrangement lies in the fact that even when a child's fingers inadvertently enter the gap 35, the table section 32 tilts, alleviating the danger of seriously injuring the child's hand.

From the foregoing description of my invention, it is apparent that I have provided an improved conveyor system in which a table section is maintained a constant distance from a pulley over which a conveyor belt is guided, even though the position of the pulley is adjusted. It is also apparent that the table section not only provides for constant spacing from the conveyor belt but is also relatively safe to use because it is yieldably supported upon the table to permit the gap between it and the conveyor belt to increase in the event that a foreign object enters the gap.

Although only one particular embodiment of the invention has been specifically disclosed herein, it will be obvious that the invention is not limited thereto but is capable of a variety of mechanical embodiments. Various changes which will now suggest themselves to those skilled in the art may therefore be made in the material, form, details of construction and arrangement of the elements without departing from the principles of my invention.

I claim:

1. In combination: a pulley adjustably positioned upon a table, said pulley being adapted for guiding a conveyor belt along the surface of a table, said table having an aperture opposite said pulley on the opposite side thereof from said belt; a movable table section in said aperture; a cross member on the upper side of said aperture at the far end thereof from said belt providing a recess for receiving a portion of said table section; a pair of support members at the opposite sides of said aperture for slidably supporting said table section therein, the ends of said support members being so positioned relative to said cross member as to permit said table section to rock on said ends; a spacer mounted on the lower side of said table section opposite said pulley; and resilient means for maintaining said table section in sliding engagement with said support members and for urging said spacer into engagement with said belt to maintain constant spacing between said belt and said table section.

2. In combination: a pulley adjustably positioned upon a table, said pulley being adapted for guiding a conveyor belt along the surface of said table, said table having an aperture opposite said pulley on the opposite side thereof from said belt; a movable table section in said aperture; a cross member on the upper side of said aperture at the far end thereof from said belt providing a recess for receiving a portion of said table section; a pair of support members at the opposite sides of said aperture for slidably supporting said table section therein; the ends of said support members being so positioned relative to said cross member as to permit said table section to rock on said ends; a vertically rotatable shaft extending through said table section opposite said pulley; a diverting arm horizontally pivotally supported on the upper end of said shaft and movable from side to side over the upper surface of said belt; a roller mounted on the lower side of said table section, the axes of rotation of said roller and said pulley being parallel; and resilient means secured to the lower end of said shaft for urging said shaft into its lower position to hold said diverting arm adjacent said belt surface and for urging said roller into engagement with said belt to maintain constant spacing between said table section and said belt.

3. In a conveyor system having horizontally spaced driving and driven pulleys mounted with their axes of rotation parallel, and with their upper peripheries adjacent a table surface, power driven means for rotating said driving pulley, an endless conveyor belt in the form of an elongated loop looped around said pulleys and guided thereby along said table surface, means for adjusting the position of said driven pulley in a direction along said surface to adjust the tension of said belt, a movable table section at the end of the belt loop adjacent said driven pulley but on the opposite side thereof from said belt loop, the upper surface of said table section extending from the upper surface of said belt, and means operatively connected to said table section and movable with said driven pulley in said direction for maintaining constant spacing between said table section and said belt in said direction during adjustment of said driven pulley.

4. In a conveyor system having horizontally spaced driving and driven pulleys mounted with their axes of rotation parallel, and with their upper peripheries adjacent a table surface, power driven means for rotating said driving pulley, an endless conveyor belt in the form of an elongated loop looped around said pulleys and guided thereby along said table surface, means for adjusting the position of said driven pulley in a direction along said surface to adjust the tension of said belt, a movable table section at the end of the belt loop adjacent said driven pulley but on the opposite side thereof from said belt loop, the upper surface of said table section extending from the upper surface of said belt, and means movable with said driven pulley in said direction including a spacer mounted on the lower side of said table section opposite said driven pulley for maintaining constant spacing in said direction between said table section and the portion of the belt passing over said driven pulley.

5. In a conveyor system having a pair of horizontally spaced pulleys mounted with their axes of rotation parallel, and with their upper peripheries adjacent a table surface, an endless conveyor belt in the form of an elongated loop looped around said pulleys and guided thereby along said table surface, means for adjusting the position of one of said pulleys along said surface to adjust the tension of said belt, a movable table section at the end of the belt loop adjacent said adjustable pulley but on the opposite side thereof from said belt loop, said table section extending from the upper surface of said belt, a roller mounted on the lower side of said table section, the axes of rotation of said roller and said pulleys being parallel, and resilient means for urging said roller into engagement with the portion of said belt passing over said adjustable pulley to maintain constant spacing between said table section and said belt.

6. In a conveyor system having a pair of horizontally spaced pulleys mounted with their axes of rotation parallel, and with their upper peripheries adjacent a table surface, an endless conveyor belt in the form of an elongated loop looped around said pulleys and guided thereby along said table surface, means for adjusting the position of one of said pulleys along said surface to adjust the tension of said belt, a movable table section at the end of the belt loop adjacent said adjustable pulley but on the opposite side thereof from said belt loop, said table section extending from the upper surface of said belt, a spacer mounted on the lower side of said table section, a vertically rotatable shaft extending through said table section opposite said adjustable pulley, a diverting arm horizontally pivotally supported on the upper end of said shaft and movable from side to side over the upper surface of said belt, and means for drawing said shaft downwardly to hold said diverting arm adjacent said belt surface and for urging said spacer into fixed relationship with respect to said adjustable pulley to maintain constant spacing between said adjustable pulley and said table section.

7. In a conveyor system having a pair of horizontally spaced pulleys mounted with their axes of rotation parallel, and with their upper peripheries adjacent a table surface, an endless conveyor belt in the form of an elongated loop looped around said pulleys and guided thereby along said table surface, means for adjusting the position of one of said pulleys along said surface to adjust the tension of said belt, a movable table section at the end of the belt loop adjacent said adjustable pulley but on the opposite side thereof from said belt loop, said table section extending from the upper surface of said belt, a roller mounted on the lower side of said table section, the axes of rotation of said roller and said pulley being parallel, a vertically rotatable shaft extending through said table section opposite said adjustable pulley; a diverting arm horizontally pivotally supported on the upper end of said shaft and movable from side to side over the upper surface of said belt, and a spring secured to the lower part of said shaft for drawing said shaft downwardly to hold said diverting arm adjacent said belt surface and for urging said roller into engagement with a belt passing over said adjustable pulley to maintain constant spacing between said table section and said belt.

8. In a conveyor system having a pair of horizontally spaced pulleys mounted with their axes of rotation parallel, and with their upper peripheries adjacent a table surface, an endless conveyor belt in the form of an elongated loop looped around said pulleys and guided thereby along said table surface, means for adjusting the position of one of said pulleys along said surface to adjust the tension of said belt, a movable table section at the end of the belt loop adjacent said adjustable pulley but on the opposite side thereof from said belt loop, said table section extending from the upper surface of said belt, a spacer mounted on the lower side of said table section, a vertically rotatable shaft extending through said table section opposite said pulley, a diverting arm horizontally pivotally supported on the upper end of said shaft and movable from side to side over the upper surface of said belt, a washer between said diverting arm and said table section, and means for drawing said shaft downwardly to hold said diverting arm adjacent said belt surface and for urging said roller into fixed relationship with respect to said adjustable pulley to maintain constant spacing between said adjustable pulley and said table section.

References Cited in the file of this patent
UNITED STATES PATENTS

| | | |
|---|---|---|
| 380,400 | Menke et al. | Apr. 3, 1888 |
| 1,590,208 | Rundell | June 29, 1926 |
| 2,030,103 | Dunlop | Feb. 11, 1936 |
| 2,110,547 | Eckerson et al. | Mar. 8, 1938 |
| 2,235,941 | Montgomery | Mar. 25, 1941 |